US008731695B2

(12) United States Patent
Sapp

(10) Patent No.: US 8,731,695 B2
(45) Date of Patent: May 20, 2014

(54) SOUND SYNTHESIS WITH DECOUPLED FORMANT AND INHARMONICITY

(75) Inventor: Markus Sapp, Appen-Etz (DE)

(73) Assignee: Apple Inc., Cupertino, CA (US)

( * ) Notice: Subject to any disclaimer, the term of this patent is extended or adjusted under 35 U.S.C. 154(b) by 537 days.

(21) Appl. No.: 13/037,648

(22) Filed: Mar. 1, 2011

(65) Prior Publication Data

US 2012/0226370 A1 Sep. 6, 2012

(51) Int. Cl.
*G06F 17/00* (2006.01)
*H04H 40/54* (2008.01)

(52) U.S. Cl.
USPC .................................................. 700/94; 381/7

(58) Field of Classification Search
CPC ............. G06F 17/00; G10H 2210/265; G10H 2250/455; G10H 2250/501; G10H 2250/505
USPC ............................ 700/94; 84/119, 627; 381/7
See application file for complete search history.

(56) References Cited

U.S. PATENT DOCUMENTS 4,406,204 A * 9/1983 Katoh ............................. 84/119
4,421,003 A * 12/1983 Kondo ............................ 84/627
7,767,902 B2 * 8/2010 Ludwig ........................... 84/741
2006/0032364 A1 * 2/2006 Ludwig ........................... 84/723

OTHER PUBLICATIONS

John M. Chowning, "The Synthesis of Complex Audio Spectra by Means of Frequency Modulation," Journal of the Audio Engineering Society, Sep. 1973, vol. 21, No. 7, pp. 526-534 (Available online at http://users.ece.gatech.edu/~mcclella/2025/labs-s05/Chowning.pdf, last visited Feb. 25, 2011).

* cited by examiner

*Primary Examiner* — Fan Tsang
*Assistant Examiner* — Eugene Zhao
(74) *Attorney, Agent, or Firm* — Blakely, Sokoloff, Taylor & Zafman LLP

(57) ABSTRACT

Disclosed herein are systems, methods, and non-transitory computer-readable storage media for allowing independent control of a formant position and inharmonic content in sound synthesis. In one aspect, this allows continuous shifting of the formant across a spectrum without producing any inharmonic spectral content. In a second aspect, this also makes it possible to generate sound with a defined inharmonic content amount and still move a formant position without changing the inharmonic content amount or to continuously change the amount of inharmonic content without significantly changing the formant position. The disclosed technology uses multiple modulators that are applied to a carrier signal by a weighted sum of their outputs.

17 Claims, 6 Drawing Sheets

SOUND SYNTHESIS WITH DECOUPLED FORMANT AND INHARMONICITY

BACKGROUND

1. Technical Field

The present disclosure relates to sound synthesis.

2. Introduction

Frequency Modulation Synthesis and Phase Modulation Synthesis—both commonly referred to as "FM Synthesis"—are well known and widely used. John Chowning first described the technique in his article "The Synthesis of Complex Audio Spectra by the Means of Frequency Modulation" in 1973. In one form, this type of modulation synthesis consists of two sine oscillators—one is called a "Carrier" and one a "Modulator". An output signal of the modulator changes the phase or frequency of the carrier, and the carrier's output signal is used as an audio signal.

The spectral content of such an FM configuration is controlled by the carrier frequency, the modulator frequency and the modulation intensity or amplitude. If carrier and modulator frequency are both integer multiples of a common fundamental frequency, then the spectrum will be purely harmonic. Otherwise the spectrum will also have inharmonic content. Inharmonicity refers to an amount of inharmonic content in a spectrum.

The ratio between carrier and modulator frequency has a strong impact on the frequency range that is most prominent. Continuously changing the modulator frequency by sweeping a formant through frequencies leads to wide areas of inharmonic sounds and only small regions of mostly harmonic results because, under current technology, the modulator/carrier frequency ratio and amount of inharmonic content in a spectrum are linked.

SUMMARY

This disclosed technology presents a method and system for modifying a conventional FM algorithm in a way that allows independent control of formant position and inharmonicity. In one aspect, this allows continuous shifting of a formant across a spectrum without leading to inharmonic spectral content. In a second aspect, this also makes it possible to generate sound with a defined inharmonicity and still move a formant position without changing that inharmonicity or to continuously change the amount of inharmonicity without significantly changing the formant position.

The disclosed technology uses multiple modulators, instead of just one, that are applied to the carrier's signal by a weighted sum of their outputs. In one aspect, the weighted sum is calculated by applying a window function to the multiple modulators. In one example, when inharmonicity is set to zero, these modulators are tuned to adjacent multiples of the carrier frequency. The window function can pronounce contributions of the modulators around a desired formant position. To introduce inharmonicity, the modulators can be detuned simultaneously by a predetermined amount, typically within a fraction of the carrier frequency.

The disclosed technology can be combined with further extensions to an FM cell, e.g. having multiple modulation paths, using a mixture of carrier and modulator as audio output, and using more complex waveforms for a carrier and/or a modulator (e.g. using asymmetrically modified variations of a sine wave).

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
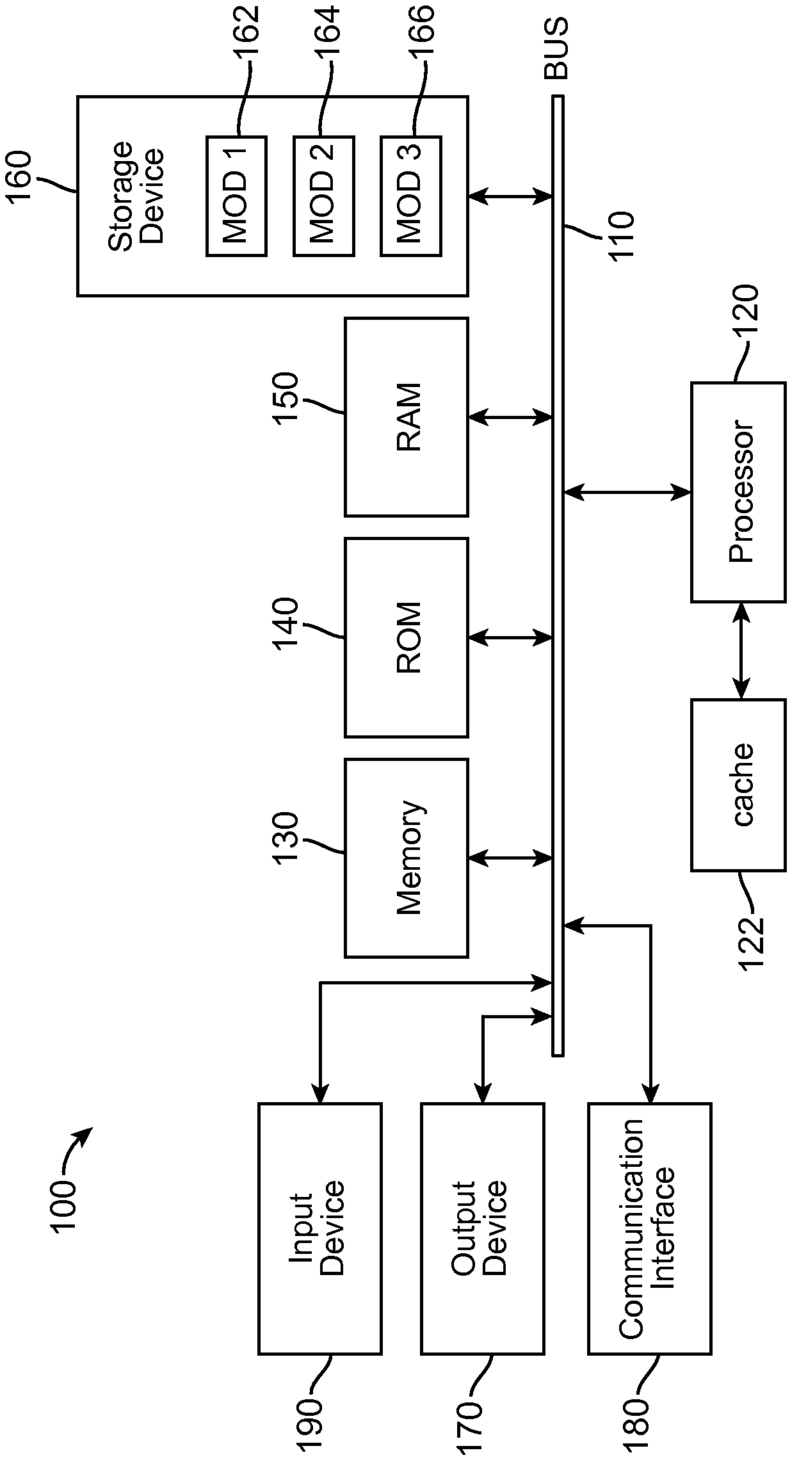
FIG. 1 illustrates an example system embodiment.

The present disclosure addresses the need in the art for independent control of formant position and inharmonicity in sound synthesis. A brief introductory description of a basic general-purpose system or computing device is shown in FIG. 1, which can be employed to practice the concepts is disclosed herein. A more detailed description of allowing independent control of formant position and inharmonicity in sound synthesis will then follow. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art, such as a speaker for generating sound. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

The output of a basic FM synthesis configuration with one carrier and one modulator is:

$$\sin(2\pi f_c t + I \sin(2\pi f_m t))$$

In this output formula, $f_c$ denotes carrier frequency, $f_m$ denotes modulator frequency and I denotes the so-called modulation Index—the depth of the phase modulation. Furthermore, "t" denotes time, that in a digital implementation is typically expressed as an integer sample position.

Figure 2:
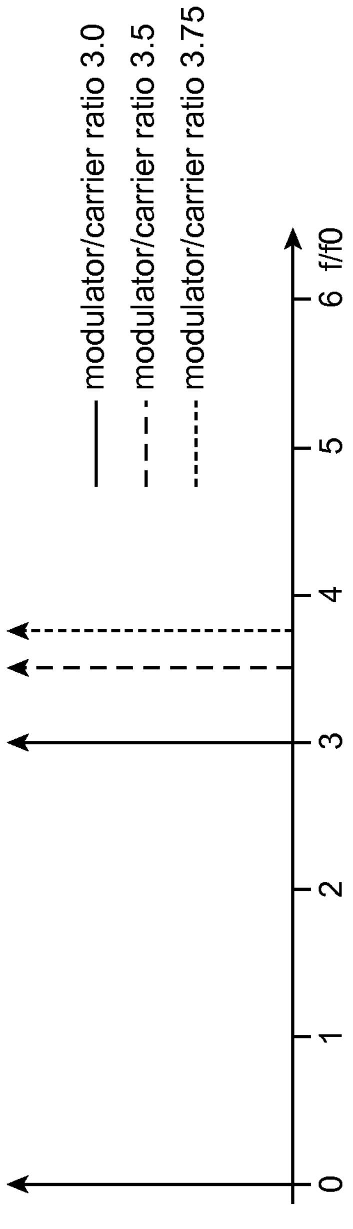
FIG. 2 illustrates a spectrum of a modulator for different modulator/carrier frequency ratios.

FIG. 2 illustrates a spectrum of a modulator for different modulator/carrier frequency ratios. More specifically FIG. 2 illustrates a modulator/carrier frequency ratio 3.0 with a solid line, which is purely harmonic and has no inharmonic content. FIG. 2 also illustrates a modulator/carrier frequency ratio of 3.5 with a dashed line and 3.75 with a dotted line which each includes a combination of harmonic and non-harmonic signals. The ratio between carrier and modulator frequency has a strong impact on the frequency range that is most prominent. But in classic FM/PM synthesis there is no way of smoothly sweeping this pronounced frequency (formant) without running through areas that result in inharmonic output spectra.

Figure 3A:
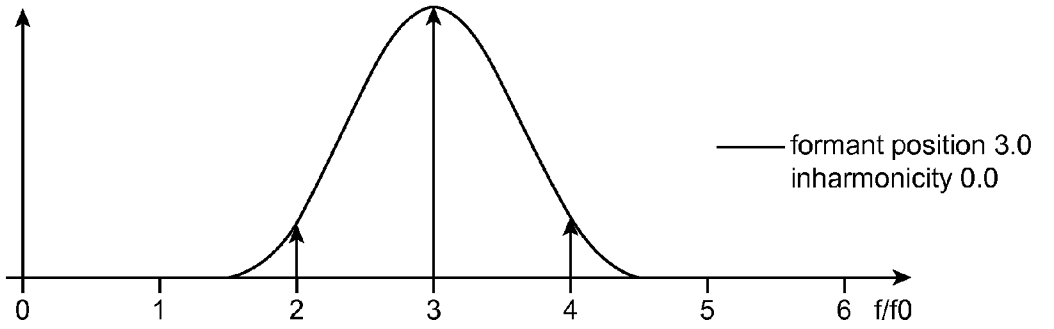
FIGS. 3A-3C illustrate a modulator spectrum with a varied formant position and inharmonicity set to 0.0.
Figure 3B:
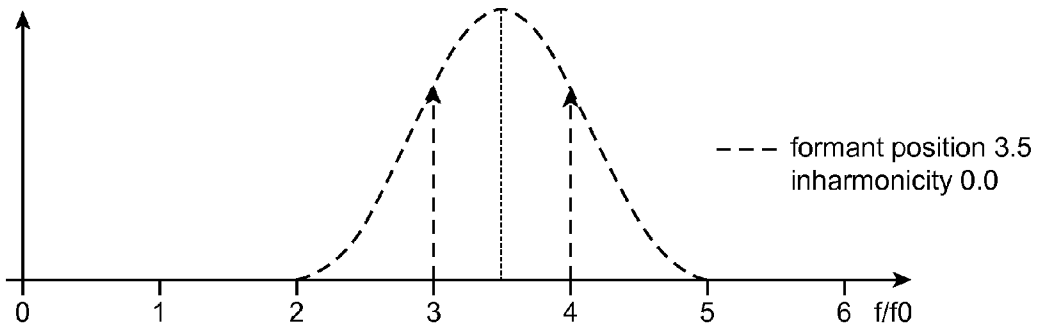
Figure 3C:
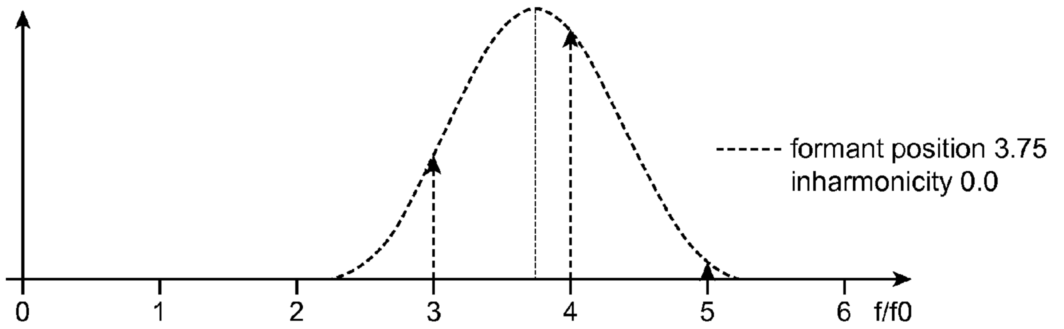

FIGS. 3A-3C, illustrate a modulator spectrum with a varied formant position and inharmonicity set to 0.0 according to principles of the disclosed technology.

In the following examples of FIGS. 3A-3C, FIG. 4, and FIG. 5, three sine wave signals (modulators) are used to build a summed modulator signal output, but it would also be possible to use more or less modulators and also to use signals other than pure sine waves.

In one example, an output signal with three sine components for the modulator can be calculated with the following values:

$i_h$ (Inharmonicity, typically between 0.0 (harmonic) and 1;

F (format position, defines position of most pronounced part in the spectrum);

$F_r$=floor(F+0.5) (formant position rounded);

$F_f$=F−$F_r$ (fractional part of formant position); and

W( ) (weighting function or window function, e.g. raised cosine window with width of 3*$f_c$).

The following formula provides one example method for generating a weighted sum output for multiple modulators:

$$\sin(2\pi f_c t+I(W(F_f-1)\sin(2\pi(i_h+F_f-1)f_c t))+(W(F_f)\sin(2\pi(i_h+F_f)f_c t))+(W(F_f+1)\sin(2\pi(i_h+F_f+1)f_c t)))$$

As in the classical FM case, $f_c$ denotes carrier frequency, I modulation index and "t" time. The window function W is a raised cosine window in this example, but any other windowing functions can be substituted.

In signal processing, a window function (also known as weighting function) is a mathematical function that is zero-valued outside of some chosen interval. When another function or one or more signals (data) is multiplied by a window function, the product is also zero-valued outside the interval: all that is left is the part where they overlap (the "view through the window). Spectral analysis and filter design can be accomplished using window functions.

FIG. 3A illustrates a modulator spectrum with a formant position of 3.0 and inharmonicity set to 0.0. This example shows three modulators contributing to a summed output. A first modulator's formant position or output signal frequency ratio is 2.0. A second modulator's formant position is 3.0. A third modulator's formant position is 4.0. As illustrated in this example, a raised cosine window function is applied to the modulators to pronounce contributions of the modulators around a desired formant position of 3.0.

FIG. 3B illustrates the modulator spectrum with a formant position of 3.5 and inharmonicity set to 0.0. This example shows two modulators contributing to a summed output. A first modulator's formant position or output signal frequency ratio is 3.0. A second modulator's formant position is 4.0. As illustrated in this example, a raised cosine window function is applied to the modulators to pronounce contributions of the modulators around the desired formant position of 3.5. In this case, only two modulators are needed because the raised cosine window intercepts the f/f0 axis at exact integer positions as shown.

FIG. 3C illustrates the modulator spectrum with a formant position of 3.75 and inharmonicity set to 0.0. This example shows three modulators contributing to a summed output. A first modulator's formant position or output signal frequency ratio is 3.0. A second modulator's formant position is 4.0. A third modulator's formant position is 5.0. As illustrated in this example, a raised cosine window function is applied to the modulators to pronounce contributions of the modulators around the desired formant position of 3.75.

Figure 4:
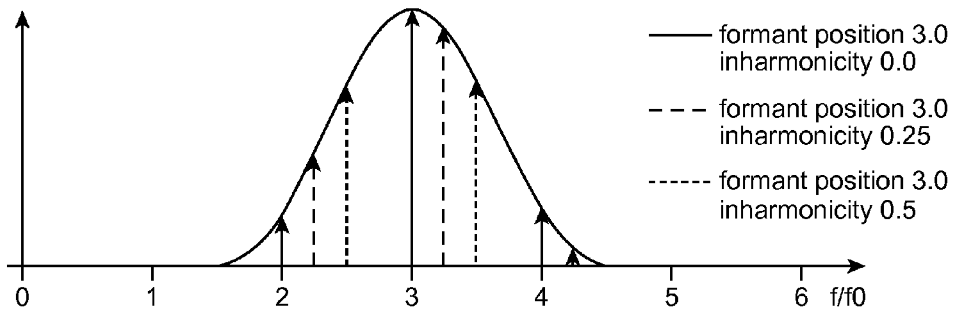
FIG. 4 illustrates a modulator spectrum with a first formant position and varied inharmonicity.

FIG. 4 illustrates a modulator spectrum with a first formant position and varied inharmonicity. FIG. 4 illustrates the modulator spectrum with a formant position of 3.0 and inharmonicity set to 0.0. This example shows three modulators, in solid lines, contributing to a summed output. A first modulator's formant position or output signal frequency ratio is 2.0. A second modulator's formant position is 3.0. A third modulator's formant position is 4.0. As illustrated in this example, a raised cosine window function is applied to the modulators to pronounce contributions of the modulators around the desired formant position of 3.0. In one example, the formant positions are shifted to accommodate a desired amount of inharmonicity.

For example, FIG. 4 illustrates the modulator spectrum with a formant position of 3.0 and inharmonicity set to 0.25. This example shows three modulators, in dashed lines, contributing to a summed output. A first modulator's formant position or output signal frequency ratio is 2.25. A second modulator's formant position is 3.25. A third modulator's formant position is 4.25. As illustrated in this example, a raised cosine window function is applied to the modulators to pronounce contributions of the modulators around the desired formant position of 3.0.

FIG. 4 also illustrates the modulator spectrum with a formant position of 3.0 and inharmonicity set to 0.50. This example shows two modulators, in dotted lines, contributing to a summed output. A first modulator's formant position or output signal frequency ratio is 2.5. A second modulator's formant position is 3.5. As illustrated in this example, a raised cosine window function is applied to the modulators to pronounce contributions of the modulators around the desired formant position of 3.0.

Figure 5:
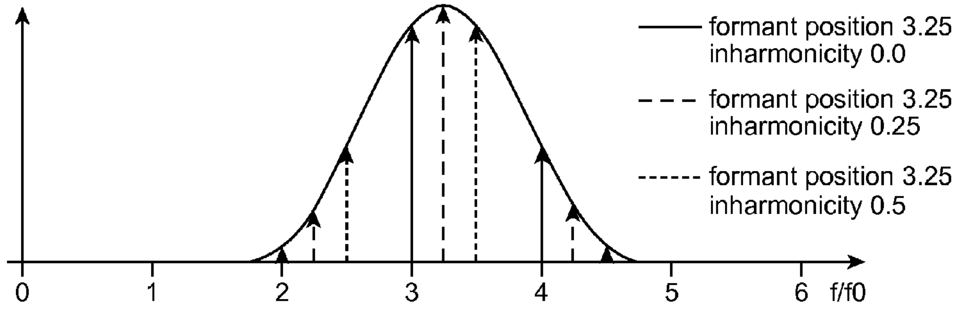
FIG. 5 illustrates the modulator spectrum of FIG. 4 with a second fixed formant position and varied inharmonicity.

FIG. 5 illustrates the modulator spectrum of FIG. 4 with a second fixed formant position and varied inharmonicity.

FIG. 5 illustrates the modulator spectrum with a formant position of 3.25 and inharmonicity set to 0.0. This example shows three modulators, in solid lines, contributing to a summed output. A first modulator's formant position or output signal frequency ratio is 2.0. A second modulator's formant position is 3.0. A third modulator's formant position is 4.0. As illustrated in this example, a raised cosine window function is applied to the modulators to pronounce contributions of the modulators around the desired formant position of 3.25. In one example, the formant positions are shifted to accommodate a desired amount of inharmonicity.

For example, FIG. 5 illustrates the modulator spectrum with a formant position of 3.25 and inharmonicity set to 0.25. This example shows three modulators, in dashed lines, contributing to a summed output. A first modulator's formant position or output signal frequency ratio is 2.25. A second modulator's formant position is 3.25. A third modulator's formant position is 4.25. As illustrated in this example, a raised cosine window function is applied to the modulators to pronounce contributions of the modulators around the desired formant position of 3.25.

FIG. 5 also illustrates the modulator spectrum with a formant position of 3.25 and inharmonicity set to 0.50. This example shows three modulators, in dotted lines, contributing to a summed output. A first modulator's formant position or output signal frequency ratio is 2.5. A second modulator's formant position is 3.5. A third modulator's formant position is 4.5. As illustrated in this example, a raised cosine window function is applied to the modulators to pronounce contributions of the modulators around the desired formant position of 3.25.

Figure 6:
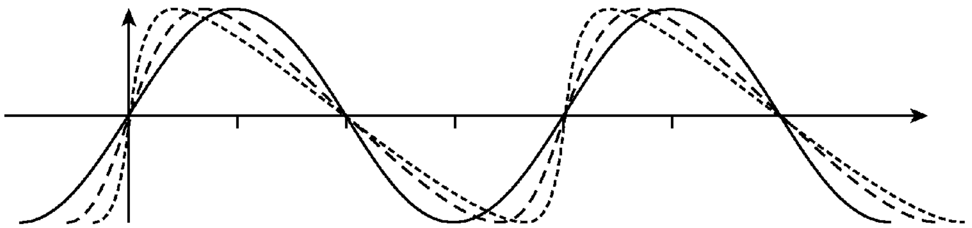
FIG. 6 illustrates useful sine wave modifications for use with the disclosed technology.

FIG. 6 illustrates useful sine wave modifications for use with the disclosed technology. The possible palette of generated sounds can be increased even further when using other waveforms than pure sine waves. In some embodiments, it may helpful to use continuous algorithmic modifications of a sine wave, like those illustrated in FIG. 6., which introduce an asymmetry while keeping the basic shape of a sine wave. Other useful sine wave modifications are possible as well, like splitting the rising and falling slopes at minimum and maximum, scaling the slope horizontally, and inserting a plateau as +1 and −1 to fill the gaps between the shortened slopes.

Figure 7:
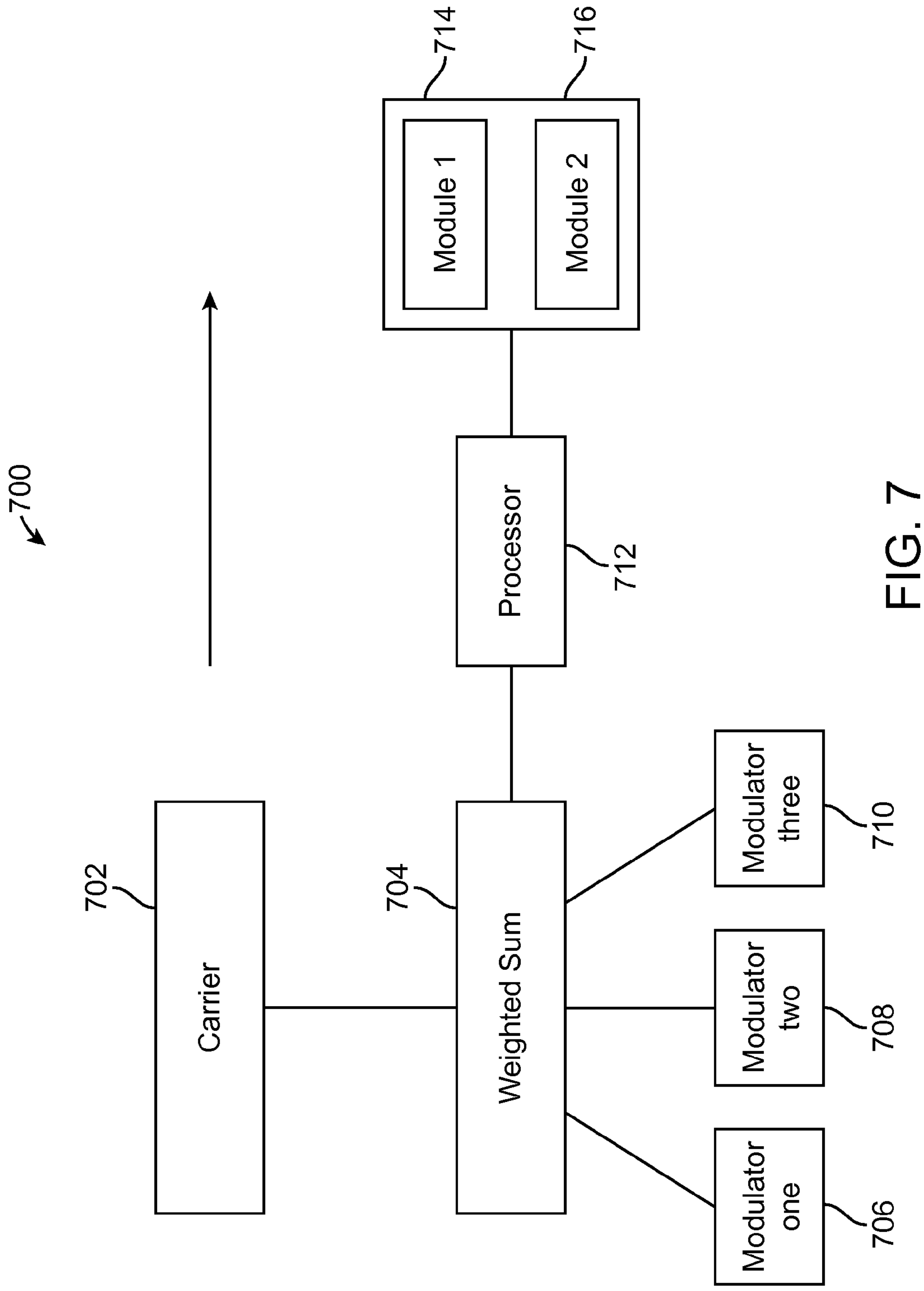
FIG. 7 illustrates an example system embodiment.

FIG. 7 illustrates an example system embodiment 700 for providing independent control of formant position and inharmonic content in sound synthesis. The system includes a carrier signal generator 702. The system includes a first modulator 706, second modulator 708, and third modulator 710. Each modulator is tuned to an adjacent multiple of the carrier signal's frequency. The system includes a processor 712. The system includes a first module 714 configured to control the processor 712 to generate a weighted sum output 704 by applying a window function to the multiple modulators. The window function is configured to pronounce contributions of the modulators around a desired formant position. The example system includes a second module 716 configured to control the processor 712 to apply the weighed sum output 704 to the carrier signal 702. In one example, each modulator is detuned by a predetermined amount to introduce a predetermined amount of inharmonic content. In one example, the applied window function is a raised cosine window, rectangular window, or triangular window.

Figure 8:
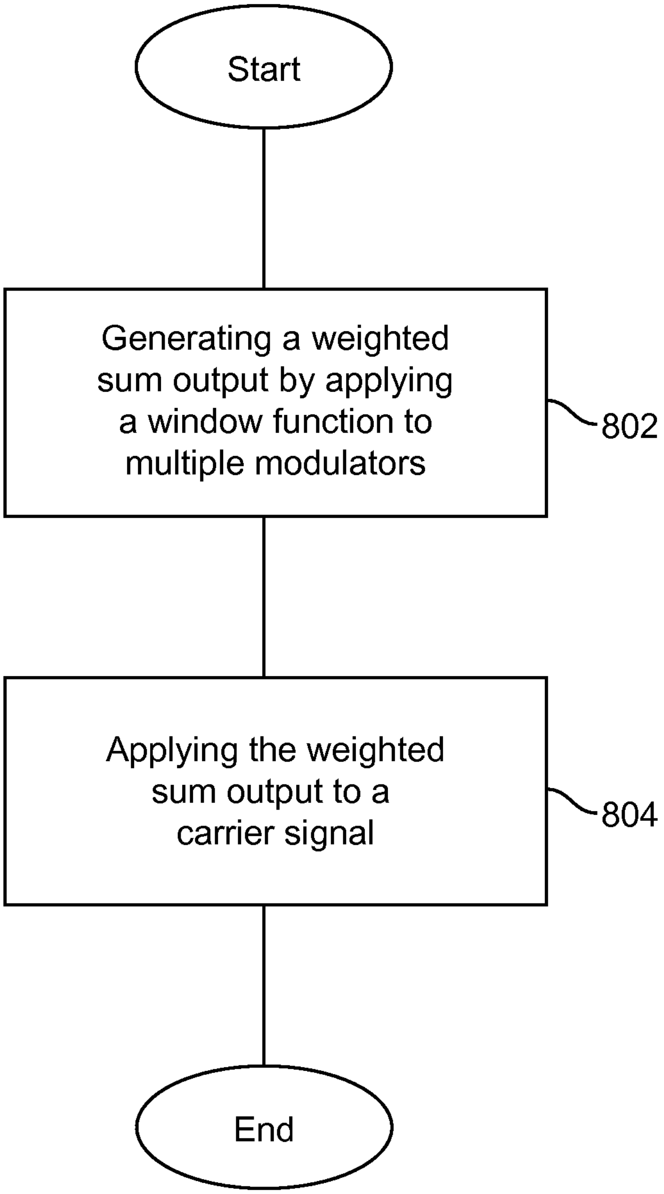
FIG. 8 illustrates an example method embodiment.

The disclosure now turns to the exemplary method embodiment 800 shown in FIG. 8. The steps outlined herein are exemplary and can be implemented in any combination thereof, including combinations that exclude, add, or modify certain steps. The method includes generating a weighted sum output (802) by applying a window function to multiple modulators. The method then includes applying the weighted sum output to a carrier signal (804). The carrier signal with the weighted sum output applied to it will create sounds. A user can then independent modify the formant position and inharmonicity of these sounds.

In one example, each modulator is tuned to an adjacent multiple of the carrier signal's frequency. In a further example, each modulator is detuned by a predetermined amount to introduce a predetermined amount of inharmonicity.

Generating the weighted sum output (802) can include applying a window function to the multiple modulators, the window function configured to pronounce contributions of the modulators around a desired formant position. Examples of window functions include a raised cosine window, rectangular window, and triangular window.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, any window function can be utilized to determine a weighted sum output for multiple modulators. Those skilled in the art will readily recognize various modifications and changes that may be made to the principles described herein without following the example embodiments and applications illustrated and described herein, and without departing from the spirit and scope of the disclosure.

I claim:

1. A method for performing audio synthesis comprising:

generating, at a signal generator, an audio carrier signal having a frequency in an audio range;

tuning multiple signal modulators to a first frequency;

simultaneously detuning each signal modulator by a first predetermined amount, to introduce a second predetermined amount of inharmonicity into an output signal of each modulator;

calculating a weighted sum of an output of at least two of the multiple modulators; and applying the weighted sum to the carrier signal to generate an audio signal having a spectrum with a specified formant position and a predetermined amount of inharmonic content.

2. The method of claim 1, further comprising tuning each of the multiple signal modulators to an adjacent multiple of the carrier signal's frequency.

3. The method of claim 1, wherein calculating the weighted sum comprises applying a window function to the multiple modulators, the window function configured to pronounce contributions of the modulators around a desired formant position.

4. The method of claim 3, wherein the window function is a raised cosine window, rectangular window, or triangular window.

5. The method of claim 1, further comprising shifting the specified formant position of the modulated signal across the spectrum from a first frequency ratio to a second frequency ratio, without producing inharmonic content during the shifting.

6. The method of claim 1, further comprising:
- generating a second modulated signal with a first formant position and a first amount of inharmonic content; and
- continuously shifting the second modulated signal to a second formant position while maintaining the first amount of inharmonic content.

7. The method of claim 6, further comprising:
- introducing a second amount of inharmonic content to the second modulated signal while substantially maintaining the signal at the second formant position.

8. A non-transitory computer-readable storage medium storing instructions which, when executed by a computing device, cause the computing device to allow independent control of formant position and inharmonic content in sound synthesis, the instructions comprising:
- generating, at a signal generator, a carrier signal having a frequency in an audio range;
- tuning multiple signal modulators to a first frequency;
- simultaneously detuning each signal modulator by a first predetermined amount, to introduce a second predetermined amount of inharmonicity into an output signal of each modulator;
- calculating a weighted sum of an output of at least two of the multiple modulators; and
- applying the weighted sum to the carrier signal to generate an audio signal having a spectrum with a specified formant position and a predetermined amount of inharmonic content.

9. The non-transitory computer-readable storage medium of claim 8, wherein the instructions include further operations comprising tuning each of the multiple signal modulators to an adjacent multiple of the carrier signal's frequency.

10. The non-transitory computer-readable storage medium of claim 8, wherein calculating the weighted sum comprises applying a window function to the multiple modulators, the window function configured to pronounce contributions of the modulators around a desired formant position.

11. The non-transitory computer-readable storage medium of claim 10, wherein the window function is a raised cosine window, rectangular window, or triangular window.

12. The non-transitory computer-readable storage medium of claim 8, wherein the instructions include further operations comprising shifting the specified formant position of the modulated signal across the spectrum from a first frequency ratio to a second frequency ratio, without producing inharmonic content during the shifting.

13. The non-transitory computer-readable storage medium of claim 8, wherein the instructions include further operations comprising:
- generating a second modulated signal with a first formant position and zero inharmonic content; and
- continuously shifting the modulated signal to a second formant position without producing inharmonic content.

14. The non-transitory computer-readable storage medium of claim 13, wherein the instructions include further operations comprising:
- introducing a second amount of inharmonic content to the second modulated signal while substantially maintaining the signal at the second formant position.

15. A sound synthesis system for a computing device, the system comprising:
- a carrier signal generator, to generate a carrier signal having a frequency in an audio range;
- multiple modulators, wherein each modulator is tuned to an adjacent multiple of the carrier signal's frequency;
- one or more processors;
- a first module configured to control the one or more processors to generate a weighted sum output by applying a window function to the multiple modulators, the window function configured to pronounce contributions of the modulators around a desired formant position; and
- a second module configured to control the one or more processors to apply the weighed sum output to the carrier signal to generate a modulated signal having a spectrum with a specified formant position and inharmonic content.

16. The system of claim 15, wherein each modulator is detuned by a first predetermined amount to introduce a second predetermined amount of inharmonic content.

17. The system of claim 15, wherein the window function is a raised cosine window, rectangular window, or triangular window.

* * * * *